US008630839B2

(12) United States Patent
Ushioda

(10) Patent No.: US 8,630,839 B2
(45) Date of Patent: Jan. 14, 2014

(54) COMPUTER PRODUCT FOR PHRASE ALIGNMENT AND TRANSLATION, PHRASE ALIGNMENT DEVICE, AND PHRASE ALIGNMENT METHOD

(75) Inventor: Akira Ushioda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1213 days.

(21) Appl. No.: 11/796,784

(22) Filed: Apr. 30, 2007

(65) Prior Publication Data

US 2008/0097742 A1 Apr. 24, 2008

(30) Foreign Application Priority Data

Oct. 19, 2006 (JP) .................................. 2006-285540

(51) Int. Cl.
*G06F 17/20* (2006.01)
*G06F 17/28* (2006.01)

(52) U.S. Cl.
USPC ................ 704/4; 704/1; 704/2; 704/3; 704/5; 704/7; 704/8

(58) Field of Classification Search
USPC ........................................................ 704/2, 4
See application file for complete search history.

(56) References Cited

U.S. PATENT DOCUMENTS

| | | | | |
|---|---|---|---|---|
| 6,535,842 | B1* | 3/2003 | Roche et al. ...................... | 704/7 |
| 7,054,803 | B2* | 5/2006 | Eisele .................................. | 704/2 |
| 7,072,826 | B1 | 7/2006 | Wakita | |
| 7,353,165 | B2* | 4/2008 | Zhou et al. .......................... | 704/5 |
| 7,752,034 | B2* | 7/2010 | Brockett et al. ................... | 704/9 |
| 2002/0040292 | A1* | 4/2002 | Marcu ................................. | 704/4 |
| 2002/0107683 | A1* | 8/2002 | Eisele ................................. | 704/2 |
| 2002/0198701 | A1* | 12/2002 | Moore ................................ | 704/2 |
| 2003/0236658 | A1* | 12/2003 | Yam .................................... | 704/2 |
| 2004/0002848 | A1* | 1/2004 | Zhou et al. ........................ | 704/2 |
| 2004/0024581 | A1* | 2/2004 | Koehn et al. ...................... | 704/2 |
| 2004/0098247 | A1* | 5/2004 | Moore ................................ | 704/4 |
| 2006/0116867 | A1* | 6/2006 | Moore ................................ | 704/2 |
| 2006/0190241 | A1* | 8/2006 | Goutte et al. ..................... | 704/2 |
| 2007/0083357 | A1* | 4/2007 | Moore et al. ...................... | 704/4 |
| 2007/0143101 | A1* | 6/2007 | Goutte ............................... | 704/9 |
| 2007/0150257 | A1* | 6/2007 | Cancedda et al. ................ | 704/2 |

FOREIGN PATENT DOCUMENTS

| | | |
|---|---|---|
| JP | 2003-345797 | 12/2003 |
| JP | 2005-025474 | 1/2005 |
| JP | 2006-178536 | 7/2006 |

OTHER PUBLICATIONS

Koehn, Philip, "Pharaoh: A Beam Search Decoder for Phrase-Based Statistical Machine Translation Models," Computer Science and Artificial Intelligence Laboratory, Massachusetts Institute of Technology, 2004, pp. 1-10.
Och et al, "The Alignment Template Approach to Statistical Machine Translation," Association for Computational Linguistics, Jun. 1, 2004, pp. 417-449.
Japanese Office Action mailed on Feb. 28, 2012, issued Japanese Patent Application No. 2006-285540 with English Translation.

* cited by examiner

*Primary Examiner* — Richemond Dorvil
*Assistant Examiner* — Michael Ortiz Sanchez
(74) *Attorney, Agent, or Firm* — Fujitsu Patent Center

(57) ABSTRACT

A unified-evaluated-value computing unit quantitatively combines a translation probability between words computed by a corpus-based statistical-value computing unit, dictionary information computed by a dictionary-information referring unit, and syntactic structure information computed by a syntactic-structure-value computing unit, to compute a unified evaluated-value as an index for phrase alignment.

16 Claims, 8 Drawing Sheets

FIG.2

| 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|
| 0 | 0 | 0 | 0 | 11 | 0 | 0 | 0 | 0 | 0 | 0 | 0 | 0 | 0 | 0 | 93 | 1 To |
| 0 | 0 | 0 | 0 | 0 | 0 | 0 | 0 | 56 | 0 | 0 | 0 | 0 | 0 | 0 | 0 | 2 strengthen |
| 0 | 0 | 0 | 0 | 0 | 0 | 0 | 0 | 0 | 0 | 0 | 0 | 0 | 0 | 0 | 0 | 3 counter |
| 0 | 0 | 0 | 0 | 0 | 0 | 0 | 0 | 0 | 0 | 0 | 0 | 0 | 0 | 0 | 0 | 4 measures |
| 0 | 0 | 0 | 0 | 0 | 0 | 0 | 0 | 0 | 0 | 0 | 0 | 0 | 0 | 0 | 0 | 5 for |
| 0 | 97 | 0 | 0 | 0 | 0 | 0 | 97 | 0 | 0 | 0 | 0 | 0 | 0 | 0 | 0 | 6 abnormal |
| 0 | 0 | 0 | 0 | 0 | 0 | 0 | 0 | 0 | 0 | 0 | 0 | 0 | 0 | 0 | 0 | 7 operating |
| 0 | 0 | 0 | 0 | 0 | 0 | 0 | 0 | 0 | 0 | 0 | 0 | 0 | 0 | 0 | 0 | 8 conditions |
| 0 | 0 | 0 | 0 | 0 | 0 | 97 | 0 | 0 | 0 | 97 | 0 | 0 | 0 | 0 | 0 | 9 , |
| 0 | 0 | 0 | 0 | 0 | 0 | 0 | 0 | 0 | 0 | 0 | 0 | 0.19 | 0 | 0 | 0 | 10 extend |
| 0 | 0 | 0 | 0 | 0 | 0 | 0 | 0 | 0 | 0 | 0 | 0 | 0 | 0 | 0 | 0 | 11 the |
| 0 | 0 | 0 | 0 | 0 | 0 | 0 | 0 | 0 | 0 | 0 | 0 | 83 | 0 | 0 | 0 | 12 lifetime |
| 100 | 0 | 0 | 0 | 0 | 0 | 0 | 100 | 0 | 0 | 0 | 100 | 0 | 100 | 0 | 0 | 13 of |
| 6 | 0 | 0 | 0 | 0 | 0 | 0 | 0 | 0 | 0 | 0 | 40 | 0 | 0 | 0 | 0 | 14 equipment |
| 0 | 0 | 0 | 0 | 0 | 38 | 0 | 0 | 0 | 38 | 0 | 0 | 37 | 0 | 0 | 0 | 15 and |
| 0 | 0 | 0 | 0 | 0 | 0 | 0 | 0 | 0 | 0 | 0 | 0 | 0 | 0 | 41 | 0 | 16 reduce |
| 0 | 0 | 0 | 0 | 0 | 0 | 0 | 0 | 0 | 0 | 0 | 0 | 0 | 0 | 0 | 0 | 17 the |
| 0 | 0 | 0 | 0 | 0 | 0 | 0 | 0 | 0 | 0 | 0 | 0 | 0 | 46 | 0 | 0 | 18 power |
| 0 | 0 | 0 | 0 | 0 | 0 | 0 | 0 | 0 | 0 | 0 | 0 | 0 | 46 | 0 | 0 | 19 consumption |
| 0 | 0 | 12 | 12 | 0 | 73 | 0 | 0 | 0 | 0 | 0 | 0 | 0 | 0 | 0 | 0 | 20 by |
| 0 | 0 | 0 | 80 | 0 | 0 | 0 | 0 | 0 | 0 | 0 | 0 | 0 | 0 | 0 | 0 | 21 detecting |
| 0 | 0 | 0 | 0 | 0 | 38 | 0 | 0 | 0 | 38 | 0 | 0 | 37 | 0 | 0 | 0 | 22 and |
| 0 | 0 | 0 | 0 | 34 | 0 | 0 | 0 | 0 | 0 | 0 | 0 | 0 | 0 | 0 | 0 | 23 informing |
| 0 | 37 | 0 | 0 | 0 | 0 | 0 | 0 | 0 | 0 | 0 | 0 | 0 | 0 | 0 | 0 | 24 various |
| 0 | 17 | 0 | 0 | 0 | 0 | 0 | 0 | 0 | 0 | 0 | 0 | 0 | 0 | 0 | 0 | 25 kinds |
| 0 | 100 | 0 | 0 | 0 | 0 | 0 | 100 | 0 | 0 | 0 | 100 | 0 | 100 | 0 | 0 | 26 of |
| 0 | 97 | 0 | 0 | 0 | 0 | 0 | 97 | 0 | 0 | 0 | 0 | 0 | 0 | 0 | 0 | 27 abnormal |
| 0 | 0 | 0 | 0 | 0 | 0 | 0 | 0 | 0 | 0 | 0 | 0 | 0 | 0 | 0 | 0 | 28 operating |
| 0 | 0 | 0 | 0 | 0 | 0 | 0 | 0 | 0 | 0 | 0 | 0 | 0 | 0 | 0 | 0 | 29 conditions |
| 100 | 0 | 0 | 0 | 0 | 0 | 0 | 100 | 0 | 0 | 0 | 100 | 0 | 100 | 0 | 0 | 30 of |
| 0.02 | 0 | 0 | 0 | 0 | 0 | 0 | 0 | 0 | 0 | 0 | 0 | 0 | 0 | 0 | 0 | 31 air |
| 0 | 0 | 0 | 0 | 0 | 0 | 0 | 0 | 0 | 0 | 0 | 0 | 0 | 0 | 0 | 0 | 32 conditioners |
| 0 | 0 | 0 | 0 | 0 | 0 | 0 | 0 | 0 | 0 | 0 | 0 | 0 | 0 | 0 | 0 | 33 in |
| 0 | 0 | 46 | 0 | 0 | 0 | 0 | 0 | 0 | 0 | 0 | 0 | 0 | 0 | 0 | 0 | 34 advance |
| 空調機の | 各種異常を | 前もって | 検出して | 報知する | ことにより | , | 異常対応の | 強化を | 図ると | 共に | , | 機器類の | 長寿命化及び | 消費電力の | 低減などを | 図る . |

FIG.3

| 1 | 2 | 3 | | |
|---|---|---|---|---|
| 100 | 0 | 0 | 1 | John |
| 0 | 10 | 90 | 2 | threw |
| 0 | 95 | 5 | 3 | red |
| 0 | 90 | 10 | 4 | balls |
| ジョーンは | 赤いボールを | 投げた | | |

FIG.4

| 1 | 2 | 3 | | |
|---|---|---|---|---|
| 100 | 0 | 0 | 1 | John |
| 0 | 105 | 95 | 2 | threw red |
| 0 | 90 | 10 | 3 | balls |
| ジョーンは | 赤いボールを | 投げた | | |

| 1 | 2 | 3 | | |
|---|---|---|---|---|
| 100 | 0 | 0 | 1 | John |
| 0 | 10 | 90 | 2 | threw |
| 0 | 185 | 15 | 3 | red balls |
| ジョーンは | 赤いボールを | 投げた | | |

(John | threw | red | balls)
H=0.55018245307825524375

(John | threw red | balls)
H = 0.61043225492335

( John | threw | red balls)
H = 0.303490087465193

FIG.7

| 1 | 2 | 3 | 4 | 5 | 6 | 7 | 8 | 9 | |
|---|---|---|---|---|---|---|---|---|---|
| 0 | 0 | 0 | 0 | 153 | 0 | 0 | 0 | 0 | To strengthen counter measures for abnormal operating conditions , |
| 0 | 0 | 0 | 0 | 0 | 0 | 83 | 0 | 0 | extend the lifetime |
| 0 | 0 | 0 | 0 | 0 | 40 | 0 | 0 | 0 | of equipment |
| 0 | 0 | 0 | 0 | 0 | 0 | 0 | 0 | 41 | and reduce |
| 0 | 0 | 0 | 0 | 0 | 0 | 0 | 92 | 0 | the power consumption |
| 0 | 0 | 80 | 0 | 0 | 0 | 0 | 0 | 0 | by detecting |
| 0 | 0 | 0 | 34 | 0 | 0 | 0 | 0 | 0 | and informing |
| 151 | 0 | 0 | 0 | 0 | 0 | 0 | 0 | 0 | various kinds of abnormal operating conditions of air conditioners |
| 0 | 46 | 0 | 0 | 0 | 0 | 0 | 0 | 0 | in advance |
| 調機の各種異常を | 前もって | 検出して | 報知すること により | 異常対応の強化を図ると共に | 機器類の | 長寿命化及び | 消費電力の | 低減などを図る . | |

COMPUTER PRODUCT FOR PHRASE ALIGNMENT AND TRANSLATION, PHRASE ALIGNMENT DEVICE, AND PHRASE ALIGNMENT METHOD

BACKGROUND OF THE INVENTION

1. Field of the Invention

The present invention generally relates to machine translation, and specifically relates to phrase alignment in machine translation.

2. Description of the Related Art

Statistical machine translation has been attracting attention as a framework for statistically extracting translation knowledge from a large data of bilingual sentence pairs and realizing highly accurate machine translation with least labor cost.

Particularly, phrase-based statistical machine translation has been suggested as a method that takes care of the weaknesses of the word-based statistical machine translation such as an IBM model. The phrase-based statistical machine translation includes using a phrase as a translation unit instead of a word. The advantages of the phrase-based statistical machine translation over the word-based statistical machine translation has been reported in, for example, Japanese Patent Laid-Open No. 2005-25474, and "Pharaoh: a Beam Search Decoder for Phrase-Based Statistical Machine Translation Models", Philipp Koehn, AMTA 2004., and "The alignment template approach to statistical machine translation", Franz-Josef Och and Hermann Ney, *Computational Linguistics*, 30(4), pp. 417-449, 2004.

In the conventional phrase-based statistical machine translation, correspondence between words in a bilingual sentence pair is first acquired using the framework for the word-based statistical machine translation such as the IBM model, and all candidates for a phrase that can agree with the correspondence are stored in a bilingual phrase table.

To improve accuracy of the phrase-based statistical machine translation, there is a need of a phrase alignment technology that can automatically extract a better-matching bilingual phrase pairs from the bilingual sentence pairs. Such a need is not limited to the machine translation. That is, even in the field of a translation aid system that supports manual translation work, there is a need to extract better-matching, or linguistically more motivated bilingual phrases; because, the phrase-based translation most efficiently supports the human translation work.

However, the conventional technology does not take into account linguistic information, so that phrases in a phrase combination acquired with the conventional technology is a simple word string that sometimes has no tangible meaning. Bilingual phrases which are specific to a certain field of documents from which they are extracted often fail to be effectively transferred from a field to another.

One approach could be to introduce linguistic knowledge by using syntactic analysis in the phrase-based statistical machine translation. However, the syntactic analysis uses an existing syntactic analyzer based on words which works independently of word combination and probability of word translation. Therefore, an error in the syntactic analysis leads to erroneous extraction or lack of extraction of the bilingual phrase pairs.

SUMMARY OF THE INVENTION

It is an object of the present invention to at least partially solve the problems in the conventional technology.

According to an aspect of the present invention, a computer-readable recording medium stores therein a computer program that causes a computer to execute receiving a bilingual sentence pair including a first-language sentence and a second-language sentence that are translation of each other; merging two adjacent phrases of at least one of the first-language sentence and the second-language sentence to form a merging pair and replacing the adjacent phrases that were merged to form the merging pair with the merging pair, and repeating the merging in a hierarchical manner; computing a unified evaluated-value to determine properness of the merging pairs acquired at the merging; determining at least one proper merging pair from among the merging pairs based on the unified evaluated-value, the proper merging pair being a merging pair that is more proper than other merging pairs; and outputting the proper merging pair as a bilingual phrase pair.

According to another aspect of the present invention, a computer-readable recording medium stores therein a computer program that causes a computer to execute receiving an input sentence in a first language; merging two adjacent phrases of at least one of a first-language sentence and a second-language sentence to form a merging pair from a bilingual sentence pair including the first-language sentence and the second-language sentence that are translation of each other and replacing the adjacent phrases, which were merged at the merging, with the merging pair, and repeating the merging in a hierarchical manner; computing a unified evaluated-value to determine properness of the merging pairs acquired at the merging; determining at least one proper merging pair from among the merging pairs based on the unified evaluated-value, the proper merging pair being a merging pair that is more proper than other merging pairs; storing the proper merging pair as a bilingual phrase pair in a bilingual-phrase-pair storage unit; computing a phrase translation probability from the bilingual phrase pair stored in the bilingual-phrase-pair storage unit; replacing a word string in the input sentence with a second-language phrase that matches the word string in the bilingual-phrase-pair storage unit by comparing the bilingual phrase pair stored in the bilingual-phrase-pair storage unit with the input sentence; generating a partial translation of the input sentence based on a history of the replacing; computing a state value indicative of superiority of a general state in a set of a phrase replacement history, a phrase-replaced sentence, and the partial translation, based on the phrase-replaced sentence, the partially translated sentence, and the phrase translation probability of the replaced phrases; ranking states in order of the superiority based on the state value; and transferring the states to the replacing in the order of the superiority.

According to still another aspect of the present invention, a phrase alignment device includes a receiving unit that receives a bilingual sentence pair including a first-language sentence and a second-language sentence that are translation of each other; a merging unit that merges two adjacent phrases of at least one of the first-language sentence and the second-language sentence to form a merging pair and replaces the adjacent phrases that were merged to form the merging pair with the merging pair, and repeats merging of phrases in a hierarchical manner; a computing unit that computes a unified evaluated-value to determine properness of the merging pairs acquired by the merging unit; a determining unit that determines at least one proper merging pair from among the merging pairs based on the unified evaluated-value, the proper merging pair being a merging pair that is more proper than other merging pairs; and an outputting unit that outputs the proper merging pair as a bilingual phrase pair.

According to still another aspect of the present invention, a phrase alignment method includes receiving a bilingual sentence pair including a first-language sentence and a second-language sentence that are translation of each other; merging two adjacent phrases of at least one of the first-language sentence and the second-language sentence to form a merging pair and replacing the adjacent phrases that were merged to form the merging pair with the merging pair, and repeating the merging in a hierarchical manner; computing a unified evaluated-value to determine properness of the merging pairs acquired at the merging; determining at least one proper merging pair from among the merging pairs based on the unified evaluated-value, the proper merging pair being a merging pair that is more proper than other merging pairs; and outputting the proper merging pair as a bilingual phrase pair.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of data in a statistical-value evaluating unit shown in FIG. 1;

FIGS. 3 to 6 are examples of data used to determine a merging pair;

FIG. 7 is an example of data output from a merging unit shown in FIG. 1;

DETAILED DESCRIPTION OF THE PREFERRED EMBODIMENTS

Exemplary embodiments of the present invention are explained below in detail referring to the accompanying drawings. The present invention is not limited to the embodiments explained below.

Figure 1:
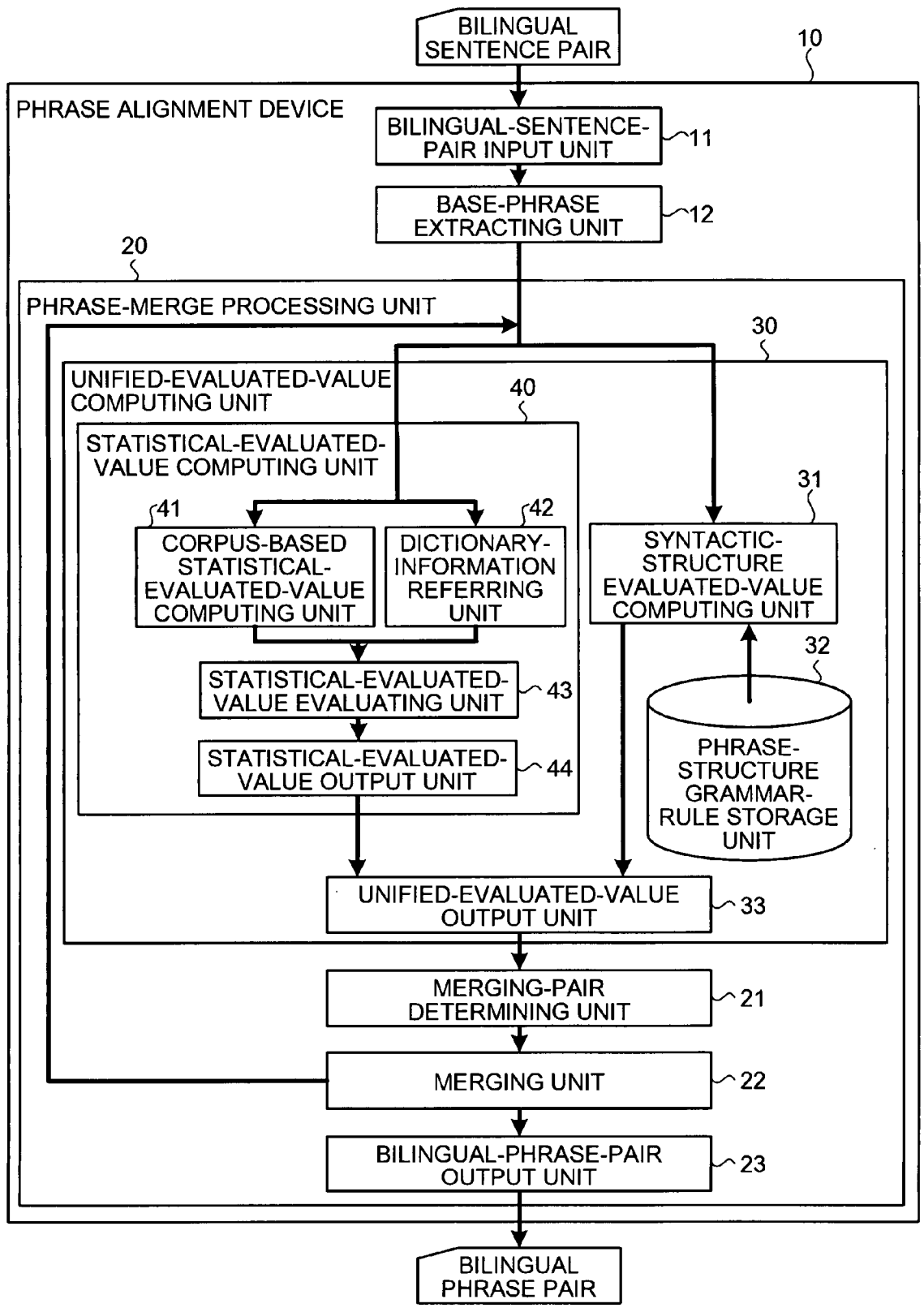
FIG. 1 is a block diagram of a phrase alignment device according to a first embodiment of the present invention.

FIG. 1 is a block diagram of a phrase alignment device 10 according to a first embodiment of the present invention. The phrase alignment device 10 includes a bilingual-sentence-pair input unit 11, a base-phrase extracting unit 12, and a phrase-merge processing unit 20.

The bilingual-sentence-pair input unit 11 receives a bilingual sentence pair. The bilingual sentence pair includes a first-language sentence and a second-language sentence that are translation of each other. The base-phrase extracting unit 12 extracts base phrases such as a noun phrase, a phrasal verb, or other forms of base phrases that are considered to be a semantic unit of words from each sentence of the bilingual sentence pair. The base-phrase extracting unit may incorporate within the unit a morphological analyzer or parser as needed.

The phrase-merge processing unit 20 extracts a bilingual phrase pair from the bilingual sentence pair and outputs the bilingual phrase pair. The bilingual phrase pair is a pair of a first-language phrase in the first-language sentence and a second-language phrase in the second-language sentence. The first-language phrase and the second-language phrase are translation of each other. Generally, a phrase is a word string that includes a plurality of words; however, a single word at a merge starting point is also referred to as a phrase in the following explanation for convenience of algorithm description.

The phrase-merge processing unit 20 performs a merging process that includes merging two adjacent phrases in one of the first-language sentence and the second-language sentence, and replacing those adjacent phrases with the merged phrase. The phrase-merge processing unit 20 hierarchically repeats the merging process. The phrase-merge processing unit 20 includes a unified-evaluated-value computing unit 30, a merging-pair determining unit 21, a merging unit 22, and a bilingual-phrase-pair output unit 23.

The unified-evaluated-value computing unit 30 computes a unified evaluated-value that is used to determine an optimal merging pair. The merging-pair determining unit 21 determines one or more optimal merging pairs, which are adjacent phrases that are to be merged, based on the unified evaluated-value. The merging unit 22 performs the merging process on the merging pair determined by the merging-pair determining unit 21. The bilingual-phrase-pair output unit 23 outputs the resulting merging pair(s) as a bilingual phrase pair.

The unified-evaluated-value computing unit 30 uses a variation in a general phrase-matching value between before and after merging the merging pair as the unified evaluated-value. The general phrase-matching value is a general matching degree of the first-language phrase and the second-language phrase, and, for example, entropy indicative of uncertainty about a phrase combination can be used as the general phrase-matching value.

To compute the unified evaluated-value, it is preferable to combine a statistic value and a syntactic structure value. The statistic value is the variation of the entropy between before and after merging. The syntactic structure value is used to determine whether a new phrase generated by merging two phrases can be a syntactic constituent of the sentence that includes the phrases.

The unified-evaluated-value computing unit 30 includes a statistical-evaluated-value computing unit 40, a syntactic-structure evaluated-value computing unit 31, a phrase-structure grammar-rule storage unit 32, and a unified evaluated-value output unit 33. The unified evaluated-value output unit 33 combines the statistical value computed by the statistical-evaluated-value computing unit 40 and the syntactic structure value computed by the syntactic-structure evaluated-value computing unit 31.

The syntactic-structure evaluated-value computing unit 31 computes a relative frequency of a syntactic structure of the new phrase in the corpus by referring to phrase-structure grammar rules in the phrase-structure grammar-rule storage unit 32, and outputs the relative frequency as the syntactic structure value. The syntactic structure of the new phrase corresponds to a subtree that includes the new phrase in a syntax tree without excess or deficiency, and the relative frequency is a proportion of a subtree that includes the identical structure and the identical node label appears to subtrees that includes the identical top node label.

The statistical-evaluated-value computing unit 40 includes a corpus-based statistical-evaluated-value computing unit 41, a dictionary-information referring unit 42, a statistical-evaluated-value evaluating unit 43, and a statistical-evaluated-value output unit 44.

The corpus-based statistical-evaluated-value computing unit 41 statistically computes a translation probability between the first-language phrase and the second-language phrase based on a bilingual corpus using a statistical translation model. The dictionary-information referring unit 42 detects phrase combination based on dictionary data such as a bilingual dictionary, a synonym dictionary, and a thesaurus.

The statistical-evaluated-value evaluating unit 43 evaluates the statistical value using output from the corpus-based statistical-evaluated-value computing unit 41 and the statistical-evaluated-value output unit 44, and the statistical-evaluated-value output unit 44 outputs the statistical value.

To compute the statistical value, it is desirable to exclude a probability of appearance of a stop word from computation of the entropy by providing a stop-word detecting unit (not shown) when the variation in the entropy between before and after merging is computed. The stop word is, for example, a function word that appears very often and semantically means nothing.

Moreover, it is desirable to fix a word combination acquired using the statistical translation model as a fixed combination, and acquire a word combination that was not specified by the statistical translation model using the dictionary-information referring unit 42.

The dictionary-information referring unit 42 can be configured to store therein a combination of a pair of corresponding words, a matching frequency, and dictionary information as the word combination so that the statistical value is computed by the dictionary-information referring unit 42 alone.

An operation of the phrase alignment device 10 is explained below assuming that the bilingual-sentence-pair input unit 11 receives the following bilingual sentence pair:
First-Language Sentence:
To strengthen counter measures for abnormal operating conditions, extend the lifetime of equipment and reduce the power consumption by detecting and informing various kinds of abnormal operating conditions of air conditioners in advance.
Second-Language Sentence:
空調機の各種異常 を前もって検出し て報知するこ とにより、異常対応の強化
を図ると共に、 機器類の長寿命化 及び消費電力の 低減などを図る。

Unless base phrase extraction is performed on the bilingual sentence pair, it is input to the unified-evaluated-value computing unit 30 as shown below:
First-Language Sentence:
To strengthen counter measures for abnormal operating conditions, extend the lifetime of equipment and reduce the power consumption by detecting and informing various kinds of abnormal operating conditions of air conditioners in advance.
Second-Language Sentence:
空調機の各種異常 を前もって検出し て報知するこ とにより、異常対応の強化
を図ると共に、 機器類の長寿命化 及び消費電力の 低減などを図る。

On the contrary, if the base-phrase extracting unit 12 performs the base-phrase extraction, at lease one of the bilingual sentence pair is divided into base phrases before the bilingual sentence pair is input to the unified-evaluated-value computing unit 30. Two examples of the input are given below.

FIRST EXAMPLE

First-Language Sentence:
To strengthen counter measures for abnormal operating conditions, extend the lifetime of equipment and reduce the power consumption by detecting and informing various kinds of abnormal operating conditions of air conditioners in advance.

Second-Language Sentence:
[空調機 の] [各種 異常 を] [前 もって] [検出 して] [報知 する]
[ことに より]、[異常 対応の] [強化 を] [図 る と共に]、[機器 類 の]
[長寿命 化 及び] [消費電力 の] [低減 など を] [図る]。

SECOND EXAMPLE

First-Language Sentence:
To strengthen [counter measures] for [abnormal operating conditions], extend [the lifetime] of equipment and reduce [the power consumption] by [detecting and informing] [various kinds] of [abnormal operating conditions] of [air conditioners] [in advance].
Second-Language Sentence:
[空調機 の] [各種 異常 を] [前 もって] [検出 して] [報知 する]
[ことに より]、[異常 対応の] [強化 を] [図 る と共に]、[機器 類 の]
[長寿命 化 及び] [消費電力 の] [低減 など を] [図る]。

Computation of the statistical value using the first example is explained below by referring to FIG. 2. A number at each row in a bilingual-phrase-pair matrix shown in FIG. 2 indicates a translation probability of a first-language word corresponding to the row (for example, "abnormal" in a sixth row) in percentage.

For example, assuming that a value at an intersection of an i-th row and a j-th column is $C(i,j)$, a first-language word in the i-th row is $w(i)$, and a second-language phrase in the j-th column is $v(j)$, $C(i,j)$ indicates a probability that $w(i)$ is translated as any of word strings in a phrase $v(j)$, i.e., a translation probability.

When the translation probabilities that $w(i)$ is translated as different character strings $t1$ and $t2$ in $v(j)$ are both positive values being $Pc(t1|w(i))$ and $Pc(t2|w(i))$ respectively, $C(i,j)$ is a sum of the two, which is $C(i,j)=100(Pc(t1|w(i))+Pc(t2|w(i)))$. The translation probability is calculated in the same manner if there are more than two character strings.

A translation probability $Pc(B|A)$ is a probability that A is translated as B, which is computed by the corpus-based statistical-evaluated-value computing unit 41 using the statistical translation model. If $C(i,j)$ and $C(i,k)$ of two different phrases $v(j)$ and $v(k)$ in the second language are both positive values, each of the values is indicated as it is in the bilingual-phrase-pair matrix without being normalized. The same rule applies if there are more than two first-language phrases.

When a bilingual sentence pair is given, the probability that $w(i)$ in the first-language sentence appears in $v(j)$ $P(v(j)|w(i))$, i.e., a conditional probability, is calculated as described below.

The following equation can be derived from an assumption that a translation of $w(i)$ certainly appears in the second-language sentence:

$$\Sigma_j \Sigma_t P(t|w(i)) P(t \text{ appears in } v(j)) = 1 \qquad (1)$$

Where t is a translation candidate for $w(i)$, $P(t|w(i))$ is a translation probability that $w(i)$ is translated as t in the bilingual sentence pair, and $P(t$ appears in $v(j))$ is a probability that t appears in $v(j)$.

Because the bilingual translation pair is already known, $P(t$ appears in $v(j))$ is zero if $v(j)$ does not include t as the character string, and it is one if t is included. To be precise, there is a possibility that t is not a translation of $w(i)$ even if $v(j)$ includes t; however, $P(t$ appears in $v(j))$ herein is determined as described above.

The translation probability $P(t|w(i))$ is assumed to be proportional to the translation probability $Pc(t|w(i))$ that is computed based on the bilingual corpus independently of the context. In other words, the following equation stands with any t and w(i):

$$P(t|w(i))=\lambda Pc(t|w(i)) \quad (2)$$

$\lambda$ is a constant.

The following equation can be derived from Equations (1) and (2):

$$\lambda \Sigma_j \Sigma_t Pc(t|w(i))P(t \text{ appears in } v(j))=1$$

The following equation can be derived from the definition of C(i,j):

$$\Sigma_t Pc(t|w(i))P(t \text{ appears in } v(j))=C(i,j)/100$$

$$\lambda \Sigma_j C(i,j)/100=1$$

$$\lambda=100/[\Sigma_j C(i,j)]$$

$$P(t|w(i))=100 \times Pc(t|w(i))/[\Sigma_j C(i,j)]$$

Therefore, P(t appears in v(j)) is calculated using the following equation:

$$P(v(j)|w(i)) = \sum_t P(t|w(i))P(t \text{ appears in } v(j)) \quad (3)$$
$$= \sum_t 100 \times P(t \text{ appears in } v(j)) \times Pc(t|w(i))/\left[\sum_j C(i,j)\right]$$
$$= C(i,j)/\left[\sum_j C(i,j)\right]$$

Hence, P(v(j)|w(i)) is the value of C(i,j) divided by a row margin, i.e., relative value per row.

Similarly, a probability that v(j) is generated as a translation of w(i) Pt(w(i)|v(j)) can be defined as the relative value per row of C for v(j) in the second language. While other definitions are possible, the following assumption is applied to the first embodiment:

$$Pt(w(i)|v(j))=C(i,j)/[\Sigma_i C(i,j)] \quad (4)$$

Focusing on the i-th row of the bilingual phrase matrix, likelihood for determining which phrase in the second-language sentence the translation of w(i) appears in is considered. If P(v(j)|w(i)) is equal to one, the translation of w(i) absolutely appears in v(j), and, in terms of information theory, the entropy of the determination is zero. An entropy H(i) is calculated using the following equation:

$$H(i)=-\Sigma_j P(v(j)|w(i))\log_2 P(v(j)|w(i)) \quad (5)$$

Based on the relation of lims→0x $\log_2$ x=0, when P(v(j)|w(i))=0 applies to any v(j), H(i) is assumed to be zero.

The merging-pair determining unit 21 couples first-language phrases or second-language phrases from the bottom up to form a larger phrase by merging adjacent rows or adjacent columns.

As an example of using the statistical value as a unified evaluated-value for merging, the entropy is used to determine superiority of teach merging pair. The variation of the entropy due to the merging is computed in the same manner as computing the variation of the entropy (or information gain) by dividing sample groups according to a value of an attribute thereof in a decision tree. However, while a data group is divided into subgroups in the decision tree, phrases are merged in the method according to the first embodiment.

FIG. 3 is an example of the bilingual phrase matrix indicative of values of C(i,j). Entropies in the first language in rows are:

$$H(1)=-(100/100)\log_2(100/100)=0$$

$$H(2)=-(10/100)\log_2(10/100)-(90/100)\log_2(90/100)$$
$$=0.468995593589281$$

$$H(3)=-(95/100)\log_2(95/100)-(5/100)\log_2(5/100)$$
$$=0.286396957115956$$

$$H(4)=-(90/100)\log_2(90/100)-(10/100)\log_2(10/100)$$
$$=0.468995593589281$$

The total entropy in the first language is calculated using the following equation:

$$H\_tot=(100 \times H(1)+100 \times H(2)+100 \times H(3)+100 \times H(4))/400=0.3060\,970360736295$$

Entropies in the second language in columns are:

$$Ht(1)=-(100/100)\log_2(100/100)=0$$

$$Ht(2)=-(10/195)\log_2(10/195)-(95/195)\log_2(95/195)-(90/195)\log_2(90/195)=1.24003625010867$$

$$Ht(3)=-(90/105)\log_2(90/105)-(5/105)\log_2(5/105)-(10/105)\log_2(10/105)=0.722857897732969$$

The total entropy in the second language is calculated using the following equation:

$$Ht\_tot=(100 \times Ht(1)+195 \times Ht(2)+105 \times Ht(3))/(100+195+105)=0.7942678700828809875$$

Hence, general entropy for a combination of the first language in the rows and the second language in the columns is calculated as an average of the two using the following equation:

$$H=(H\_tot+Ht\_tot)/2=0.55018245307825524375$$

If a second row (threw) and a third row (red) are merged, the bilingual phrase matrix changes as shown in FIG. 4.

As calculated in the case of FIG. 3, the total entropy in the first language H_tot is 0.616346837918725, the total entropy in the second language Ht_tot is 0.604517671927974, and the average of the entropies in the first language and the second language H is 0.61043225492335.

Figures 5, 6:
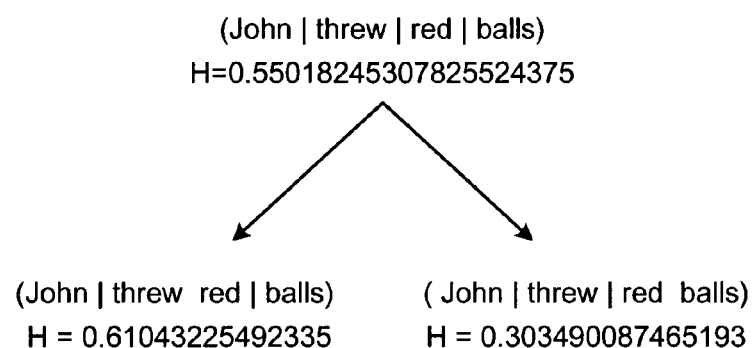

If the third row (red) and the fourth row (balls) are merged, the bilingual phrase matrix changes as shown in FIG. 5.

In this case, the total entropy in the first language is 0.309404670460569, the total entropy in the second language is 0.297575504469818, and the average of the entropies in the first language and the second language is 0.303490087465193.

By evaluating the merging processes based on the entropies, as shown in FIG. 6, the merging of "red" and "balls" is superior to the merging of "threw" and "red".

By evaluating merging processes based on the entropies thereof, a high-quality bilingual phrase pair, i.e., a pair of phrases that can be highly properly translated as each other, can be determined.

FIG. 7 is an example of the bilingual phrase pair output from the merging unit 22 using the evaluation method for the merging pair. Each of the following phrase pairs is output:

To strengthen counter measures for abnormal operating conditions/ 異常対応の強化を 図ると共に
    extend the lifetime/ 長寿命化及び
    of equipment/ 機器類の
    and reduce/ 低減などを図る
    the power consumption/ 消費電力の
    by detecting/ 検出して
    and informing/ 報知することにより various kinds of abnormal operating conditions of air conditioners/ 機器類の各種異常を in advance/ 前もって

As described above, by performing the phrase alignment and the partial syntactic analysis at the same time, the phrase alignment device 10 according to the first embodiment suppresses side effects due to erroneous syntactic analysis.

Moreover, by adding the dictionary information at the phrase alignment process, the data sparseness is relieved, and the accuracy of the phrase alignment is improved.

According to the phrase alignment in the conventional phrase-based statistical machine translation, data of the translation probability between words is discarded after the word combination is extracted. The superiority of the extracted bilingual phrase pair is computed only from the occurrence frequency of the phrase pair in the corpus, and it is difficult to extract a highly versatile bilingual phrase pair.

On the contrary, the method according to the first embodiment uses a general evaluation standard that quantitatively combines the translation probability between words, the dictionary information, and the syntactic structure information. Because the linguistically supported information such as the syntactic structure information and the dictionary information is quantitatively incorporated as well as the translation probability between words is efficiently taken advantage of, the phrase alignment can be performed taking into account the superiority information.

While the phrase is evaluated based on the entropy according to the first embodiment, the evaluation can be performed using other indices indicative of the general matching degree of corresponding phrases in the bilingual sentence pair. For example, the phrase can be evaluated in the following process:

A maximum element in each row in the bilingual-phrase-pair matrix is identified, and a sum of the maximum elements in the rows is divided by the total of all the elements in the bilingual-phrase-pair matrix, which is defined as a tolerance factor. The same calculation is performed on the column basis.

For example, the matrix is assumed as below:

| 1 | 0 | 10 |
|---|---|----|
| 20 | 2 | 1 |
| 0 | 30 | 0 |

The maximum elements are:

| 1 | 0 | 10 | ⇒ | 10 |
|---|---|----|---|----|
| 20 | 2 | 1 | ⇒ | 20 |
| 0 | 30 | 0 | ⇒ | 30 |

The total of the maximum elements is 10+20+30=60.
The total of all the elements in the bilingual-phrase-pair matrix is:

$1 + 0 + 10$ $+20 + 2 + 1$ $+0 + 30 + 0$ $= 64$

Therefore, the tolerance factor of the rows in the bilingual-phrase-pair matrix is 60/64=0.9375.

The tolerance factor of the columns is similarly calculated as shown below:

| 1 | 0 | 10 |
|---|---|----|
| 20 | 2 | 1 |
| 0 | 30 | 0 |
| ↓ | ↓ | ↓ |
| 20 | 30 | 10 |
| 60/64 = 0.9375 | | |

The general tolerance factor is an average of the two:

(0.9375+0.9375)/2=0.9375

When the entropy is used, a smaller value indicates a higher matching degree of the phrases. On the contrary, when the tolerance factor is used, a larger value indicates a higher matching degree of the phrase. When the phrases correspond one-to-one like the following matrix, the tolerance factor is 1.0.

| 0 | 0 | 10 |
|---|---|----|
| 20 | 0 | 0 |
| 0 | 30 | 0 |

While the first embodiment was explained assuming that the phrase alignment device 10 is used as a dedicated device to perform the phrase alignment method according to an aspect of the present invention, each component in the phrase alignment device 10 can be realized by executing a software-based phrase alignment program on a general-purpose computer system.

The phrase-based statistical machine translation that uses the bilingual phrase pair acquired by the phrase alignment according to the first embodiment is explained as a second embodiment of the present invention.

Figure 8:
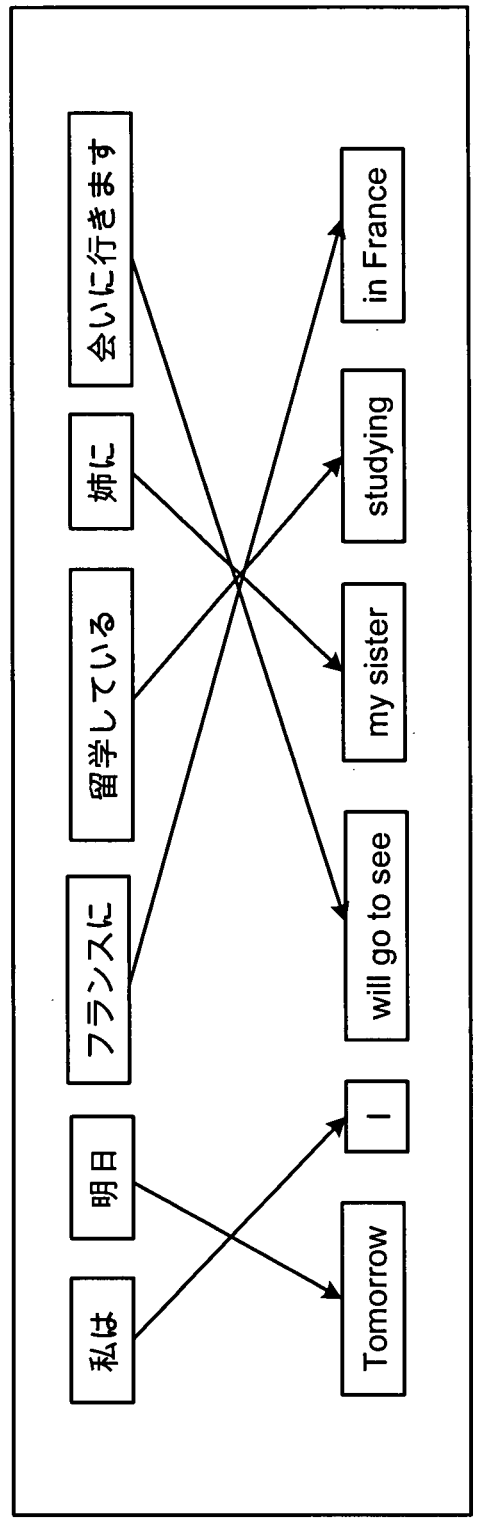
FIG. 8 is an example of a translation process according to a second embodiment of the present invention.

FIG. 8 is an example of the process of the phrase-based statistical machine translation according to the second embodiment. A Japanese input sentence is divided into columns of appropriate phrases. Each of the Japanese phrases is translated as an English phrase, which is referred to as phrase translation. The translated English phrases are rearranged before an English sentence is output.

In general, the statistical translation model is formulated in a noisy channel model, and divided into a translation model and a language model based on Bayes' rule. In other words, a probability that a certain Japanese sentence j is translated as an English sentence e p(e|j) is a product of a probability that e is translated as j p(j|e) and a probability of generating e p(e).

$$p(e|j)=p(j|e) \cdot p(e)/p(j) \quad (6)$$

An English sentence e* that is optimal as a translation of j is e that makes the largest solution of Equation (6).

$$e^*=\mathrm{argmax}_e p(e|j)=\mathrm{argmax}_e p(j|e) \cdot p(e)/p(j)$$

Because p(j) does not depend on e, the following equation stands:

$$e^*=\mathrm{argmax}_e p(j|e) \cdot p(e) \quad (7)$$

A model from which p(j|e) can be derived is referred to as a translation model, and a model from which p(e) can be derived is referred to as a language model.

The language model is used to compute a probability of generating a certain English expression by referring to a large English corpus, and a word-based n-gram model (for example, n=3) is used in general. During the translation process, the input sentence j is divided into a string of I phrases $j'_{1-I} = j'_1, j'_2, \ldots, j'_I$, and each Japanese phrase $j'_i$ is translated as an English phrase $e'_i$. While there is no limitation to an order of the Japanese phrases to be translated, the resulting sentence is generated from the beginning to the end of the sentence.

Independently of the translation model and the language model, a word cost can be used as a factor to adjust a length of an English output sentence. The word cost is calculated using the following equation:

$$WC = \omega^{length(e)} \quad (8)$$

$\omega$ is a constant, which dominates a long output sentence when it is larger than one. To prevent the order of the phrases in the target language from greatly deviating from the order of the phrases in the original language, a distortion cost can be used; however, a restriction to the word order often obstructs an optimal solution in the case of translation from Japanese to English, and therefore, an explanation of the distortion cost is omitted herein.

Using the following equation, e* optimal as a translation of j is determined:

$$e^* = \arg\max_e p(e|j) = \arg\max_e p(j|e) \cdot p_{LM}(e) \cdot \omega^{length(e)}$$

Where $p_{LM}(e)$ is the language model, and the translation model $p(j|e)$ is a product of translation probabilities of phrases.

$$p(j|e) = p(j'_{1-I}|e'_{1-I}) = \prod_{i=1}^{I} p(j'_i|e'_i)$$

A value V used to determine e* is calculated using the following equation:

$$V = \prod_{i=1}^{I} p(j'_i|e'_i) \cdot p_{LM}(e) \cdot \omega^{length(e)} \quad (9)$$

Figure 9:
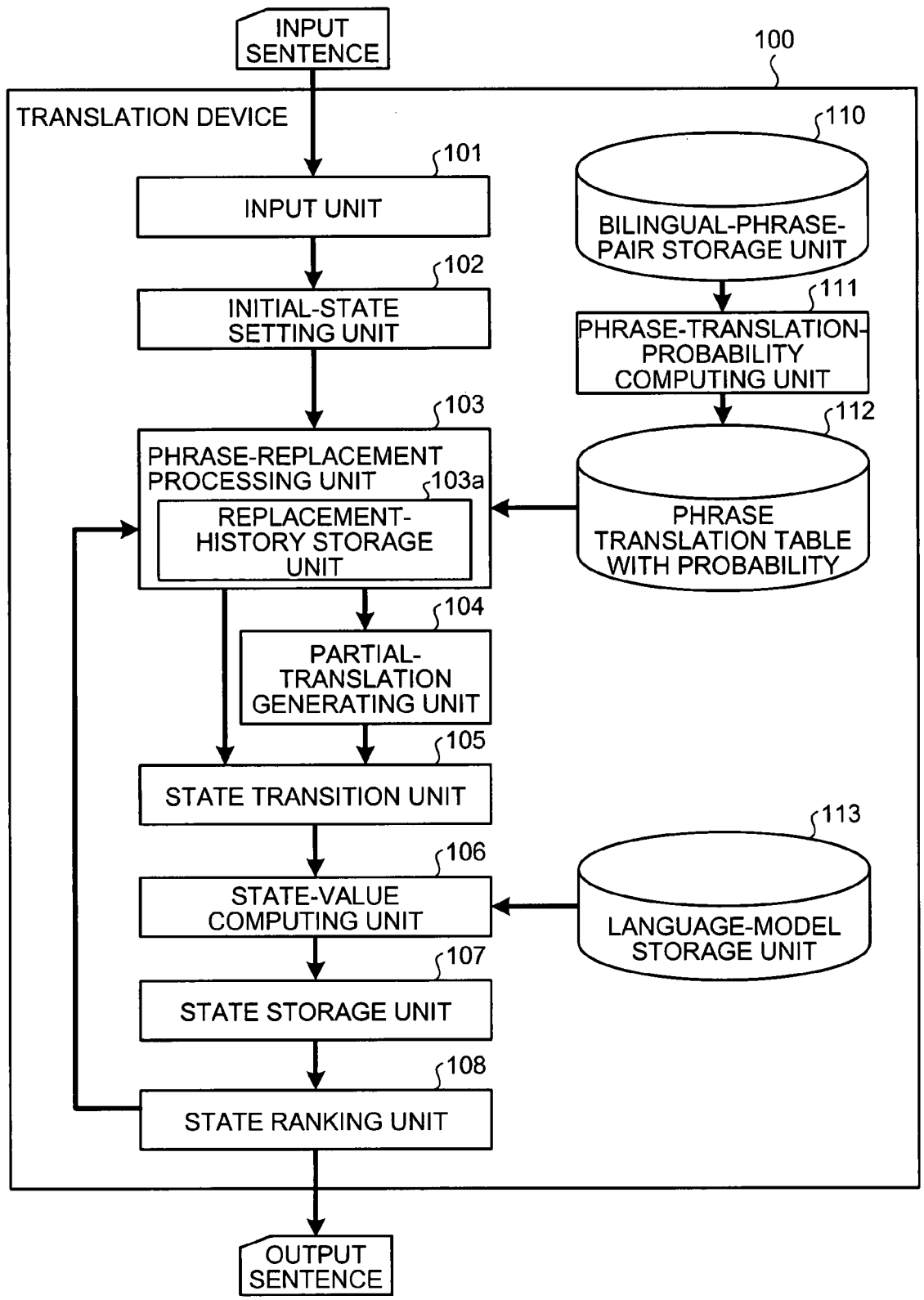
FIG. 9 is a block diagram of a translation device based on phrase-based statistical machine translation according to the second embodiment.

FIG. 9 is a block diagram of a translation device 100 according to the second embodiment. In the translation device 100, a bilingual-phrase-pair storage unit 110 stores therein the bilingual phrase pair acquired by the phrase alignment according to the first embodiment. A phrase-translation-probability computing unit 111 computes the translation probability of each bilingual phrase pair. A phrase translation table with probability 112 stores therein the bilingual phrase pair and the translation probability as a bilingual phrase pair with translation probability.

When an input unit 101 receives an input sentence, an initial-state setting unit 102 sets initial values to a certain state. The state herein is a set of a phrase replacement history, an input sentence divided into phrases (hereinafter, "phrase-replaced sentence"), and a partial translation. The phrase replacement history is stored in a replacement-history storage unit 103a, and the partial translation is generated by a partial-translation generating unit 104. Because the phrase replacement is not yet performed in the initial state, the phrase replacement history is NULL, the phrase-replaced sentence is the sentence as was input, and the partial translation is an empty string.

A phrase-replacement processing unit 103 compares a character string in the Japanese input sentence with Japanese expressions of the bilingual phrase pairs in the phrase translation table with probability 112, and replaces the character string with an English expression corresponding to the bilingual phrase pair that matches the character string. The Japanese input sentence can be divided into morphemes by morphological analysis in advance. In such a case, the character string in the input sentence needs to be a single morpheme or equal to a character string that includes two or more successive morphemes.

The comparison can start from any position of the input sentence and in any order. A new state is generated from a pair of a single matching character string and a single translation candidate for the character string.

Figure 10:
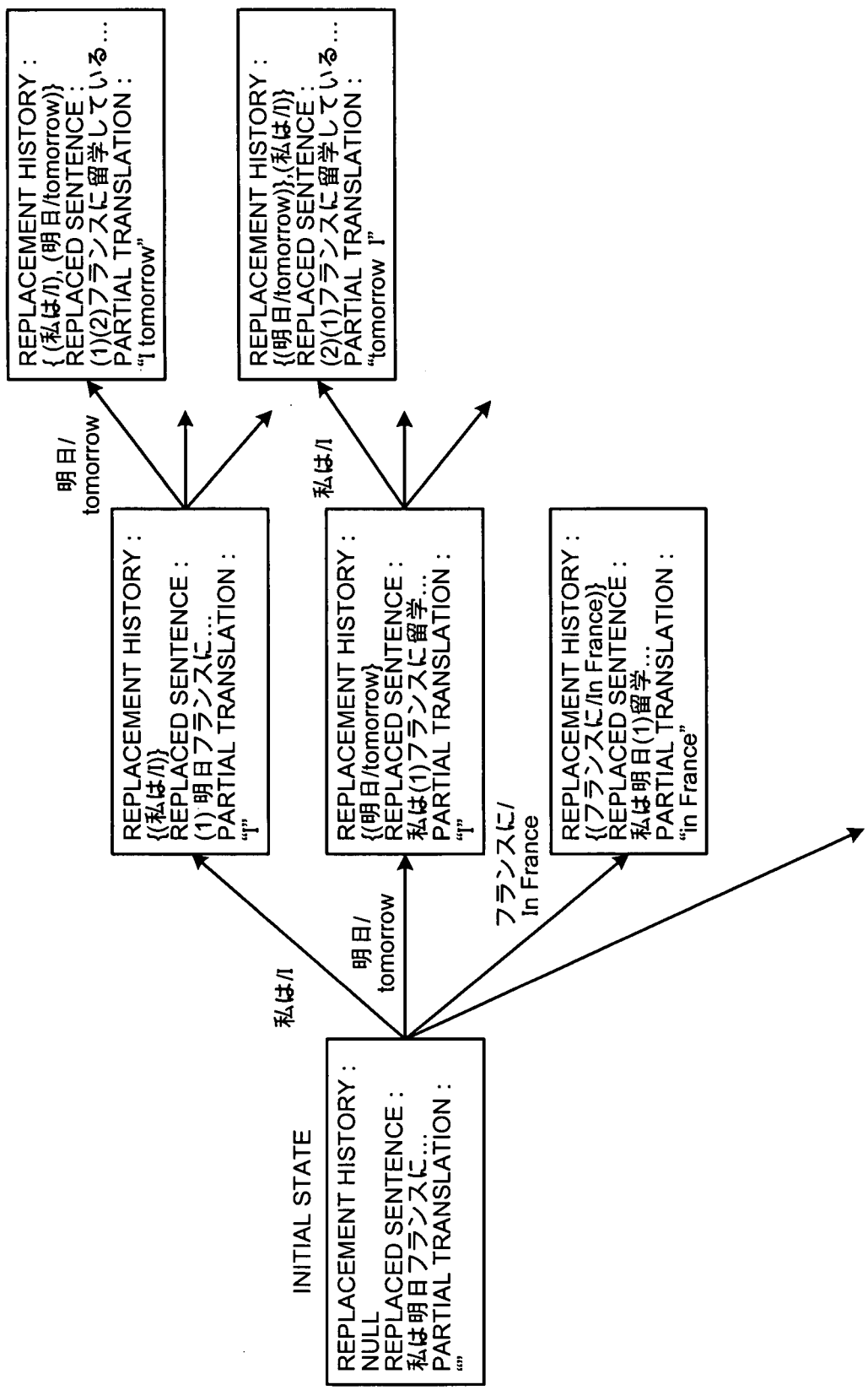
FIG. 10 is an example of state transition performed by a state transition unit shown in FIG. 9.

FIG. 10 is an example of a state transition performed by a state transition unit 105. Each square indicates a state, and an arrow that connects two states indicates the state transition. The bilingual phrase pair used for the phrase replacement is applied to each arrow.

A value of each state is calculated using Equation (9) based on the value of a previous state and a parameter of the current state (the value of the set of the three). The new state is recorded in a state storage unit 107, and a back link to the previous state is managed by the state storage unit 107.

A state ranking unit 108 forms a group of states that include a same number of words in the partial translation, and arranges the states in the descending order of the values in the group. The states are sent to the phrase-replacement processing unit 103 in the descending order of the values, and new states are developed in the same manner.

When the whole input sentence is replaced by English phrases, a state-value computing unit 106 computes a final value using the language models in a language-model storage unit 113, the state ranking unit 108 ranks the states, and translated sentences are output in the descending order of the values.

If the state ranking unit 108 ranks all the states and sends them to the phrase-replacement processing unit 103, it has to search an enormous data. Therefore, the states are generally cut back by beam search. A beam width can be narrowed down based on an absolute number of the states to be remained as the candidates, a value relative to the highest value, or a combination of the both.

As described above, the translation device according to the second embodiment realizes highly accurate phrase-based statistical machine translation by using the high-quality bilingual phrase pair acquired by the phrase-based alignment according to the first embodiment.

Although the present invention is applied to machine translation in the second embodiment, the present invention is not limited to the machine translation. For example, the extraction of the high-quality bilingual phrase pair acquired by the present invention improves effect of translation support because the phrase-level translation achieves the highest effect in a translation supporting system that supports the manual translation work.

According to an aspect of the present invention, the side effects due to the erroneous syntactic analysis are suppressed by performing the phrase alignment and the partial syntactic analysis at the same time. Moreover, the data sparseness is relieved by adding the dictionary information during the phrase alignment process, and the accuracy of the phrase alignment is thereby improved.

According to another aspect of the present invention, the general evaluation standard for the phrase alignment that quantitatively combines the translation probability between words, the dictionary information, and the syntactic structure information is used. Because the linguistically supported information such as the syntactic structure information and the dictionary information is quantitatively incorporated as well as the translation probability between words is efficiently taken advantage of, the phrase alignment can be performed taking into account the superiority information. As a result, the high-quality bilingual phrase pair is extracted taking into account the linguistic information, and the accuracy of the translation is thereby improved.

According to still another aspect of the present invention, the translation program accumulates the bilingual phrase pairs acquired by the phrase alignment to compute the phrase translation probability, replaces the word string as a part of the input sentence with the second-language expression that matches the word string in the bilingual-phrase-pair storage unit, and generates the partial translation based on the phrase replacement history. The translation program computes the state value indicative of the superiority of the general state in the set of the phrase replacement history, the phrase-replaced sentence, and the partial translation, based on the phrase-replaced sentence, the partially translated sentence, and the phrase translation probability of the replaced phrases. The translation program ranks the superiority of the states and transfers the states to the phrase-replacement process in the descending order of the values. As a result, the translation program realizes the high accuracy of the phrase-based statistical machine translation.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program that causes a computer to execute:
   receiving a bilingual sentence pair including a first-language sentence and a second-language sentence that are translation of each other;
   first creating a modified first-language sentence by dividing the first-language sentence into a plurality of base phrases including a merging pair of two adjacent phrases within the first-language sentence;
   second creating another modified first-language sentence by dividing the first-language sentence into a plurality of base phrases including another merging pair of two adjacent phrases within the first-language sentence;
   computing a first unified evaluated-value of the modified first-language sentence and a second unified evaluated-value of the other modified first-language sentence, the first unified evaluated-value indicating an average value of a matching degree of the base phrases in the modified first-language sentence based on phrases in the second-language sentence and a matching degree of the phrases in the second-language sentence based on the base phrases in the modified first-language sentence, the second unified evaluated-value indicating an average value of a matching degree of the base phrases in the other modified first-language sentence based on the phrases in the second-language sentence and a matching degree of the phrases in the second-language sentence based on the base phrases in the other modified first-language sentence;
   determining one proper modified first-language sentence based on the first and second unified evaluated-values acquired at the computing, the proper modified first-language sentence being a modified first-language sentence in which the first-language sentence is divided into the base phrases more properly; and
   outputting a merging pair included in the proper modified first-language sentence as a bilingual phrase pair.

2. The non-transitory computer-readable recording medium according to claim 1, wherein the unified evaluated-value is a variation in a general phrase-matching value between before and after the first creating or the second creating, the general phrase-matching value being a general degree of the first-language phrase matching the second-language phrase.

3. The non-transitory computer-readable recording medium according to claim 2, wherein the general phrase-matching value is entropy indicative of uncertainty about a phrase combination.

4. The non-transitory computer-readable recording medium according to claim 2, wherein the unified evaluated-value is computed by combining the general phrase-matching value and a syntactic structure value used to determine whether the new phrase can be a syntactic constituent of a sentence that includes the phrases.

5. The non-transitory computer-readable recording medium according to claim 1, wherein the base phrases includes a noun phrase or a verb phrase other than the merging pair.

6. The non-transitory computer-readable recording medium according to claim 1, wherein the computing includes:
   statistically computing a translation probability between the first-language phrase and the second-language phrase based on a bilingual corpus using a statistical translation model; and
   detecting a phrase combination based on dictionary data such as a bilingual dictionary, a synonym dictionary, and a thesaurus.

7. The non-transitory computer-readable recording medium according to claim 4, wherein the syntactic structure value is a relative frequency of a syntactic structure of the new phrase in the bilingual corpus.

8. The non-transitory computer-readable recording medium according to claim 3, wherein the computing includes:
   detecting a stop word such as a function word that appears very often and semantically means nothing; and
   excluding a probability of appearance of the stop word from computation of the entropy when the variation in the entropy between before and after the first creating or the second creating is computed.

9. The non-transitory computer-readable recording medium according to claim 6, wherein
   the phrase combination acquired using the statistical translation model is fixed as a fixed combination at the computing, and
   a phrase combination that was not specified using the statistical translation model is acquired at the detecting.

10. The non-transitory computer-readable recording medium according to claim 6, wherein
    a pair of matching phrases and a matching frequency thereof are extracted and combined with dictionary information to be employed at the detecting as the phrase combination, and
    the computing is executed at the detecting.

11. A non-transitory computer-readable recording medium that stores therein a computer program that causes a computer to execute:
    receiving an input sentence in a first language;
    first creating a modified first-language sentence by dividing the first-language sentence into a plurality of base phrases including a merging pair of two adjacent phrases within the first-language sentence;
    second creating another modified first-language sentence by dividing the first-language sentence into a plurality of base phrases including another merging pair of two adjacent phrases within the first-language sentence;

computing a first unified evaluated-value of the modified first-language sentence and a second unified evaluated-value of the other modified first-language sentence, the first unified evaluated-value indicating an average value of a matching degree of the base phrases in the modified first-language sentence based on phrases in a second-language sentence which is a translation of the first-language sentence and a matching degree of the phrases in the second-language sentence based on the base phrases in the modified first-language sentence, the second unified evaluated-value indicating an average value of a matching degree of the base phrases in the other modified first-language sentence based on the phrases in the second-language sentence and a matching degree of the phrases in the second-language sentence based on the base phrases in the other modified first-language sentence;

determining one proper modified first-language sentence based on the first and second unified evaluated-values acquired at the computing, the proper modified first-language sentence being a modified first-language sentence in which the first-language sentence is divided into the base phrases more properly;

storing a merging pair included in the proper modified first-language sentence as a bilingual phrase pair in a bilingual-phrase-pair storage unit;

computing a phrase translation probability from the bilingual phrase pair stored in the bilingual-phrase-pair storage unit;

replacing a word string in the input sentence with a second-language phrase that matches the word string in the bilingual-phrase-pair storage unit by comparing the bilingual phrase pair stored in the bilingual-phrase-pair storage unit with the input sentence;

generating a partial translation of the input sentence based on a history of the replacing;

computing a state value indicative of superiority of a general state in a set of a phrase replacement history, a phrase-replaced sentence, and the partial translation, based on the phrase-replaced sentence, the partially translated sentence, and the phrase translation probability of the replaced phrases;

ranking states in order of the superiority based on the state value; and transferring the states to the replacing in the order of the superiority.

12. The non-transitory computer-readable recording medium according to claim 11, wherein the unified evaluated-value is a variation in a general phrase-matching value between before and after the first creating or the second creating, the general phrase-matching value being a general degree of the first-language phrase matching the second-language phrase.

13. A phrase alignment device comprising:
a receiving unit that receives a bilingual sentence pair including a first-language sentence and a second-language sentence that are translation of each other;
a merging unit that creates a modified first-language sentence by dividing the first-language sentence into a plurality of base phrases including a merging pair of two adjacent phrases within the first-language sentence, and creates another modified first-language sentence by dividing the first-language sentence into a plurality of base phrases including another merging pair of two adjacent phrases within the first-language sentence;
a computing unit that computes a first unified evaluated-value of the modified first-language sentence and a second unified evaluated-value of the other modified first-language sentence, the first unified evaluated-value indicating an average value of a matching degree of the base phrases in the modified first-language sentence based on phrases in the second-language sentence and a matching degree of the phrases in the second-language sentence based on the base phrases in the modified first-language sentence, the second unified evaluated-value indicating an average value of a matching degree of the base phrases in the other modified first-language sentence based on the phrases in the second-language sentence and a matching degree of the phrases in the second-language sentence based on the base phrases in the other modified first-language sentence;

a determining unit that determines one proper modified first-language sentence based on the first and second unified evaluated-values acquired by the computing unit, the proper modified first-language sentence being a modified first-language sentence in which the first-language sentence is divided into the base phrases more properly; and an outputting unit that outputs a merging pair included in the proper modified first-language sentence as a bilingual phrase pair.

14. The phrase alignment device according to claim 13, further comprising:
a second receiving unit that receives an input sentence in a first language;
a phrase-translation-probability computing unit that computes a phrase translation probability from bilingual phrase pairs stored in a bilingual-phrase-pair storage unit;
a phrase-replacement processing unit that replaces a word string in the input sentence with a second-language phrase that matches the word string in the bilingual-phrase-pair storage unit by comparing the bilingual phrase pair with the input sentence;
a partial-translation generating unit that generates a partial translation of the input sentence based on a history of phrase replacement performed by the phrase-replacement processing unit;
a state-value computing unit that computes a state value indicative of superiority of a general state in a set of a phrase replacement history, a phrase-replaced sentence, and the partial translation, based on the phrase-replaced sentence, the partially translated sentence, and the phrase translation probability of the replaced phrases;
a state ranking unit that ranks states in order of the superiority based on the state value; and
a state transition unit that transfers the states to the phrase-replacement processing unit in the order of the superiority.

15. A phrase alignment method comprising:
receiving a bilingual sentence pair including a first-language sentence and a second-language sentence that are translation of each other;
first creating, using a processor, a modified first-language sentence by dividing the first-language sentence into a plurality of base phrases including a merging pair of two adjacent phrases within the first-language sentence;
second creating, using the processor, another modified first-language sentence by dividing the first-language sentence into a plurality of base phrases including another merging pair of two adjacent phrases within the first-language sentence;
computing a first unified evaluated-value of the modified first-language sentence and a second unified evaluated-value of the other modified first-language sentence, the first unified evaluated-value indicating an average value of a matching degree of the base phrases in the modified first-language sentence based on phrases in the second-language sentence and a matching degree of the phrases in the second-language sentence based on the base phrases in the modified first-language sentence, the second unified evaluated-value indicating an average value of a matching degree of the base phrases in the other modified first-language sentence based on the phrases in the second-language sentence and a matching degree of the phrases in the second-language sentence based on the base phrases in the other modified first-language sentence;

determining one proper modified first-language sentence based on the first and second unified evaluated-values acquired at the computing, the proper modified first-language sentence being a modified first-language sentence in which the first-language sentence is divided into the base phrases more properly; and outputting a merging pair included in the proper modified first-language sentence as a bilingual phrase pair.

16. The phrase alignment method according to claim 15, further comprising:

receiving an input sentence in a first language;

computing unit that computes a phrase translation probability from bilingual phrase pairs stored in a bilingual-phrase-pair storage unit;

replacing a word string in the input sentence with a second-language phrase that matches the word string in the bilingual-phrase-pair storage unit by comparing the bilingual phrase pair with the input sentence;

generating a partial translation of the input sentence based on a history of phrase replacement performed by the replacing;

computing a state value indicative of superiority of a general state in a set of a phrase replacement history, a phrase-replaced sentence, and the partial translation, based on the phrase-replaced sentence, the partially translated sentence, and the phrase translation probability of the replaced phrases;

ranking states in order of the superiority based on the state value; and transferring the states to the replacing in the order of the superiority.

* * * * *